United States Patent
Théry et al.

(10) Patent No.: US 10,594,346 B2
(45) Date of Patent: Mar. 17, 2020

(54) METHOD FOR ATTENUATING INTERFERENCE GENERATED BY INTERMODULATION PRODUCTS

(71) Applicants: Continental Automotive France, Toulouse (FR); Continental Automotive GmbH, Hannover (DE)

(72) Inventors: Laurent Théry, Les Essarts le Roi (FR); Chao Lin, Maurepas (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/487,138

(22) PCT Filed: Mar. 26, 2018

(86) PCT No.: PCT/FR2018/050720
§ 371 (c)(1),
(2) Date: Aug. 20, 2019

(87) PCT Pub. No.: WO2018/178546
PCT Pub. Date: Oct. 4, 2018

(65) Prior Publication Data
US 2019/0379413 A1    Dec. 12, 2019

(30) Foreign Application Priority Data
Mar. 31, 2017 (FR) ...................................... 17 52746

(51) Int. Cl.
*H04B 1/66* (2006.01)
*H04B 1/10* (2006.01)

(52) U.S. Cl.
CPC ... *H04B 1/1036* (2013.01); *H04B 2001/1045* (2013.01)

(58) Field of Classification Search
CPC ................ H04B 10/294; H04B 10/296; H04B 2001/1045; H04B 1/10; H01B 1/1036
(Continued)

(56) References Cited

U.S. PATENT DOCUMENTS 5,390,345 A    2/1995 Wada et al.
7,386,285 B2*  6/2008 Yamauchi ............. H03M 1/185
                                              455/127.2

(Continued)

OTHER PUBLICATIONS

International Search Report and Written Opinion for International Application No. PCT/FR2018/050720, dated Jun. 4, 2018, 9 pages.
(Continued)

*Primary Examiner* — Sonny Trinh
(74) *Attorney, Agent, or Firm* — RatnerPrestia

(57) ABSTRACT

A method for attenuating interference generated by intermodulation products with respect to a multiplexed radio signal having a desired frequency the method includes implementing an automatic gain control having a gain setpoint configurable between a first setpoint and a second setpoint lower than the first setpoint; configuring the automatic gain control so that the gain setpoint is equal to the first setpoint; detecting the presence of co-channel interference at the desired frequency; if co-channel interference is detected at the desired frequency, then, if the automatic gain control is active, configuring it so that the gain setpoint is equal to the second setpoint and, if the automatic gain control is not active, configuring it so that the gain setpoint is equal to the first setpoint.

12 Claims, 2 Drawing Sheets

(58) Field of Classification Search
USPC .... 455/127.2, 136, 138, 232.1, 240.1, 250.1
See application file for complete search history.

(56) References Cited

U.S. PATENT DOCUMENTS

| | | | | |
|---|---|---|---|---|
| 8,059,834 | B2* | 11/2011 | Tanaka | H03G 3/001 |
| | | | | 330/254 |
| 8,149,965 | B2* | 4/2012 | Sankabathula | H04L 1/206 |
| | | | | 375/316 |
| 10,230,345 | B1* | 3/2019 | Arslan | H03G 3/001 |
| 10,469,112 | B2* | 11/2019 | Coban | H03G 3/3078 |
| 2002/0105928 | A1 | 8/2002 | Kapoor et al. | |
| 2006/0268973 | A1 | 11/2006 | Yang | |

OTHER PUBLICATIONS

Chayavadhanangkur et al., "Analysis of FM Systems with Co-Channel Interference Using a Click Model", IEEE Transactions on Commuications, 1976, pp. 903-910.

\* cited by examiner

METHOD FOR ATTENUATING INTERFERENCE GENERATED BY INTERMODULATION PRODUCTS

CROSS REFERENCE TO RELATED APPLICATIONS

This application is the U.S. National Phase Application of PCT International Application No. PCT/FR2018/050720, filed Mar. 26, 2018, which claims priority to French Patent Application No. 1752746, filed Mar. 31, 2017, the contents of such applications being incorporated by reference herein.

FIELD OF THE INVENTION

The invention relates to the field of reception of frequency-modulated radio signals, in particular in mobile radio receivers exposed to issues with interference generated by intermodulation products.

This problem arises when intermodulation products of high-power radio signals interfere with a desired low-power radio signal.

The present invention relates to a method able to attenuate the interference generated by intermodulation products.

BACKGROUND OF THE INVENTION

As is known, a radio receiver, in particular in a multimedia system of a motor vehicle, is able to receive a radio signal, in particular an FM radio signal, FM being the acronym of "frequency modulation".

Such an FM radio signal, received in modulated form by a radio receiver, is subjected to various sensors and to suitable filtering so that the corresponding demodulated radio signal can be played under good conditions, especially in the passenger compartment of a motor vehicle.

Those skilled in the art know the operating principle of an FM, that is to say frequency-modulated, radio signal received by a suitable radio receiver, with a view to being demodulated and then played to listeners.

A known issue with the reception of an FM radio signal via a mobile radio receiver, in particular one integrated into a motor vehicle, is that of intermodulation.

Those skilled in the art know the principle of the effect referred to as intermodulation. In practice, the imperfection of the amplifier of the radio receiver in question induces a distortion of received radio signals. As is known, in particular, the characteristics of the distortion related to intermodulation may be defined in the following way: if two respective frequency signals F1 and F2 enter into a perfect amplifier, two superposed signals of frequency F1 and F2 are output.

Because of intermodulation, an imperfect amplifier outputs, in addition to the frequencies F1 and F2, other frequencies, namely F1−F2, F1+F2, 2×F1−F2, 2×F2−F1 and, generally, any frequency m×F1+n×F2, m and n being relative integers.

These frequencies m×F1+n×F2 are parasitic. Such intermodulation products may prove to be particularly disadvantageous when of 3rd order, when it is therefore a question of the frequencies 2×F1−F2 and 2×F2−F1, because of the associated powers remain high.

To mitigate this problem, a known solution consists in implementing a technique for automatically controlling gain, which is implemented before an element needing to be protected, such as a low-noise amplifier (LNA), a mixer or an analogue-digital converter. The principle of automatic gain control is known to those skilled in the art. The automatic gain control is implemented by a regulating circuit the function of which is to limit the amplitude of the signal that it outputs.

Automatic gain control, in the context of reception of FM radio signals, makes it possible to avoid, generally, any signal overload.

When intermodulation occurs and automatic gain control is active, the attenuation of all of the received signals in particular allows the intermodulation products to be more greatly attenuated.

Specifically, when the automatic gain control induces an attenuation of 1 dB in the first-order signal, the intermodulation products of the 3rd order are attenuated by 3 dB.

One major drawback of this prior-art technique is that very strong signals may create, because of intermodulation products, a phantom frequency substantially equal to a frequency of a desired but low-power radio signal. This creates co-channel interference.

In this context, implementation of automatic gain control may, in certain cases, induce an attenuation such that the desired weak radio signal is suppressed.

It will be noted, in this context, that the means for automatically controlling gain conventionally integrated into vehicle radio receivers may apply, to received FM radio signals, an attenuation of as much as −40 dB.

Another known technique for mitigating the problems created by intermodulation products consists in scanning the entire passband in order to identify all the strong signals and in calculating all the intermodulation products in order to identify potential "conflicts". However, this technique requires a second tuner in the radio receiver and its implementation conventionally takes several tens of seconds, this being incompatible with the way in which users actually use radio receivers, and in particular radio receivers located on-board vehicles.

SUMMARY OF THE INVENTION

To mitigate the aforementioned drawbacks, in the context where automatic gain control is being employed, an aspect of the present invention aims to adapt the employed automatic gain control depending on whether or not co-channel interference generated by intermodulation products is affecting a desired weak radio signal, by means of a dynamic modification of the setpoint of said aforementioned automatic gain control.

In practice, according to an aspect of the invention, if intermodulation products are generating co-channel interference affecting a desired radio signal, in particular one of low power, the setpoint of the automatic gain control is decreased in order to increase the attenuation applied to the received radio signals. In contrast, if no co-channel interference generated by intermodulation products is detected as affecting a desired radio signal, in particular one of low power, then the setpoint of the automatic gain control is increased in order to limit the attenuation applied to the received radio signals and to allow the desired radio signal to be received, even when it is of low power.

In other words, by virtue of an aspect of the invention, the nominal value of the setpoint of the automatic gain control may be higher than in the prior art, so as to promote the performance in terms of desensitization, said setpoint then being decreased once the presence of co-channel interference and strong signals is detected.

More precisely, one subject of an aspect of the present invention is a method for attenuating interference generated by intermodulation products with respect to a multiplexed radio signal comprising a desired frequency, corresponding to the frequency of a frequency-modulated radio signal that a user desires to receive by way of a radio receiver able to receive frequency-modulated radio signals, said method comprising the following steps:

implementing an automatic gain control having a gain setpoint configurable between a first setpoint and a second setpoint, said second setpoint being lower than said first setpoint, said automatic gain control being activated to decrease the gain of the received multiplexed radio signals when the gain of a received multiplex radio signal is higher than said gain setpoint, such that, after application of said automatic gain control, the highest gain of said received multiplexed radio signals is lower than or equal to said gain setpoint;
  configuring the automatic gain control so that the gain setpoint is equal to the first setpoint;
  implementing a detection of the presence of co-channel interference at the desired frequency;
  if co-channel interference is detected at the desired frequency, then, if the automatic gain control is active, configuring the automatic gain control so that the gain setpoint is equal to the second setpoint and, if the automatic gain control is not active, configuring the automatic gain control so that the gain setpoint is equal to the first setpoint.

By virtue of the method according to an aspect of the invention, the automatic gain control implemented in a radio receiver, in particular one located in a motor vehicle, may have a first high-gain setpoint, the gain of which is typically about 88 dB, and in any case higher than it is in the prior art, the gain setpoint of the automatic gain control being able to be modified, in real time, in order to take the value of the second gain setpoint, which is lower than the first setpoint, when co-channel interference generated by intermodulation products is detected.

Thus, assuming that there is no interference caused by intermodulation products, the probability of being able to sense a weak radio signal corresponding to the desired frequency is improved.

Advantageously, the second setpoint is lower than the first setpoint by 3 dB to 12 dB, and preferably by about 6 dB.

Advantageously, the first setpoint is equal to 88 dB.

According to one embodiment, the detection of the presence of co-channel interference comprises the following steps:

checking that said multiplexed radio signal has a symmetric passband;
  detecting and counting a plurality of positive noise peaks and a plurality of negative noise peaks in said multiplexed radio signal during a preset measurement duration;
  calculating a rate of positive or negative noise peaks among said plurality of peaks;
  determining a score characteristic of a probability that co-channel interference exists in said multiplexed radio signal depending on said rate of positive or negative noise peaks.

According to one embodiment, the detection of the presence of co-channel interference comprises a prior step of comparing the signal-to-noise ratio of the multiplexed radio signal to a preset threshold, a positive or negative noise peak being taken into account only if said signal-to-noise ratio in said multiplexed radio signal is higher than said preset threshold, said preset threshold preferably being equal to 20 dB.

According to one embodiment, said preset, measurement time is equal to 128 ms, plus or minus 10 ms.

According to one embodiment, the score is defined as being equal to:

$$1 - K \times \frac{\text{abs}(N_{mean}^+ - N_{mean}^-)}{N_{mean}^v}$$

where $N_{mean}^+$ is the rate of positive noise peaks averaged over the preset measurement duration, $N_{mean}^-$ is the rate of negative noise peaks averaged over the preset measurement duration, $N_{mean}^v$ is the total number of noise peaks taken into account, and K is a scale factor to be determined.

An aspect of the present invention moreover relates to a radio receiver comprising a microcontroller configured to implement the method such as briefly described above.

An aspect of the present invention also relates to a motor vehicle comprising a radio receiver such as briefly described above.

BRIEF DESCRIPTION OF THE DRAWINGS

Aspects of the invention will be better understood on reading the following description, which is given merely by way of example, with reference to the appended drawings, which show.

DETAILED DESCRIPTION OF THE PREFERRED EMBODIMENTS

The method for attenuating interference generated by intermodulation products in an FM radio signal, according to an aspect of the invention, is described below mainly with a view to an implementation in a radio system of a multimedia system located in a motor vehicle.

However, an aspect of the present invention may be implemented in any other technical field, and in particular in any type of FM radio receiver.

An aspect of the invention is intended to be implemented in the context of reception of FM radio signals.

Figure 1:
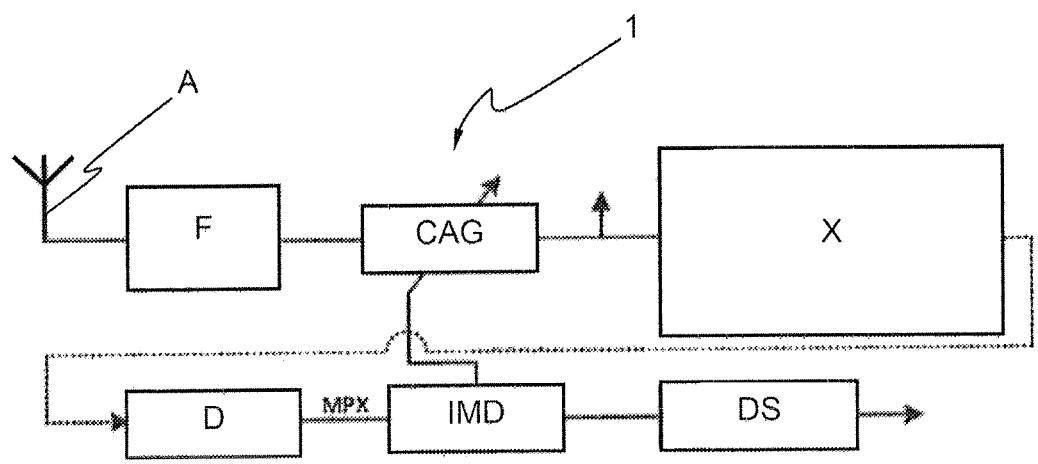
FIG. 1, the simplified diagram of an FM radio receiver in which the method according to an aspect of the invention is implemented, FIG. 2, the working diagram of an example of a system for detecting the presence of co-channel interference, FIG. 3, the flow chart summarizing the operation of the method according to an aspect of the invention.

With reference to FIG. 1, when an FM radio signal is received by an antenna A of a radio receiver 1, said FM radio signal is filtered via an external passband filter F before being, where appropriate, attenuated by means for applying automatic gain control CAG, in particular in order to avoid any overload in the case of presence of strong signals.

This signal is then processed by suitable means X, for example allowing the pre-amplification thereof or the conversion thereof into a digital format. The signal is demodulated by means of an FM demodulator, referenced D in FIG. 1, in order to deliver a multiplexed radio signal MPX.

According to an aspect of the invention, this multiplexed radio signal MPX is analyzed by means of a system IMD for detecting the presence of co-channel interference (which system is described in detail below) in order to detect any interference caused by intermodulation products, the result of this analysis being used to adapt the parameters of the automatic gain control CAG. Specifically, according to an aspect of the invention, the automatic gain control CAG has a configurable gain setpoint, corresponding to the maximum gain beyond which the received FM radio signals are attenuated.

In practice, the user of the radio receiver in question desires to listen to an FM radio signal having a given frequency, called the "desired frequency". In the absence of interference caused by intermodulation products resulting in co-channel interference that affects the desired frequency, the method according to an aspect of the invention allows the automatic gain control CAG to be configured with a high-gain setpoint. Advantageously, this at least allows the received FM radio signals to be attenuated so that, in particular, if the received FM radio signal corresponding to the desired frequency is weak, then said signal will not undergo an attenuation that would have, in the prior art, risked suppressing it.

In contrast, if the presence of interference caused by intermodulation products is detected, resulting in co-channel interference that affects the desired frequency, the method according to an aspect of the invention allows the automatic gain control CAG to be configured with a lower gain setpoint. Advantageously, this allows the received FM radio signals to be attenuated more when intermodulation products are causing interference.

With reference to FIG. 1, as is known, the multiplexed radio signal MPX is then decoded by means of a stereo decoder DS before being played.

It follows from the above that an aspect of the present invention comprises a step of detecting a situation in which intermodulation products are generating co-channel interference, with a view to allowing suitable configuration, in real time, of the setpoint of the automatic gain control applied to the received FM radio signal.

Figure 2:
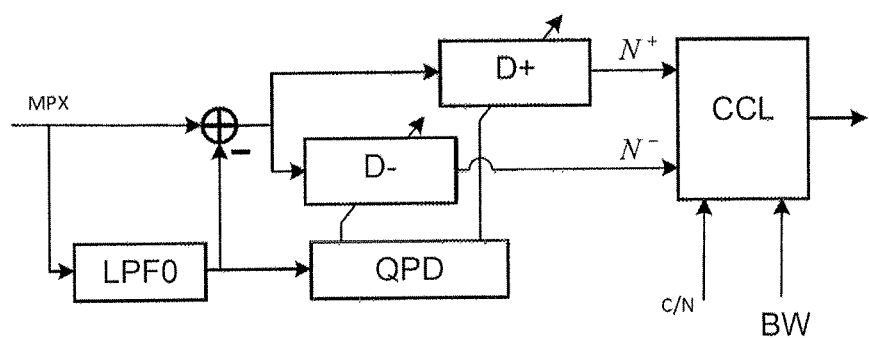

With reference to FIG. 2, an example of an embodiment of a system for detecting the presence of co-channel interference is described below.

From a theoretical point of view, it will be noted that the operating principle of such a system for detecting co-channel interference is described in the document "*C. CHAYAVADHANANGKUR* et al., Analysis of FM Systems with Co-Channel Interference Using a Click Model, IEEE TRANSACTIONS ON COMMUNICATIONS", incorporated herein by reference, in which the authors discuss the stochastic property of noise in a signal subject to co-channel interference.

It has thus been demonstrated that, in an FM radio signal, the noise may be decomposed into the sum of a white noise and of "click noise", i.e. "noise peaks", corresponding to noise pulses forming noise "diracs" in the FM radio signal. This typically occurs when the demodulator of the radio receiver in question "hops" to a neighboring radio signal, whether it is a question of an adjacent radio signal, i.e. a signal at a neighboring frequency, or a co-channel signal, i.e. a signal on the same frequency, or even a signal due to a multipath effect.

However, the distribution of these noise peaks may be analyzed statistically, in order to identify the potential presence of co-channel interference.

From a theoretical point of view, it has therefore been demonstrated, in particular in the document by C. CHAYA-VADHANANGKUR et al. cited above, that the presence of co-channel interference results, at the output of the demodulator of the radio receiver in question, in the presence of a term having a high signal-to-noise ratio, which may be decomposed into "click noise", i.e. positive and negative noise peaks that occur randomly and independently, added to a base term.

In the case where the signal-to-noise ratio is sufficient, and provided that the passband of said multiplexed radio signal is symmetric, the probability of occurrence of positive and negative noise peaks is described by two independent Poisson distributions with a similar rate of occurrence of peaks. In other words, the number of detected positive noise peaks and the number of detected negative noise peaks, in a sufficiently long preset time range, are substantially equal.

The system for detecting co-channel interference in a multiplexed FM radio signal MPX, shown in FIG. 2, forms a co-channel interference sensor. The system for detecting co-channel interference preferably comprises a zero-phase lowpass filter LPFO for removing the baseline of the multiplexed FM radio signal MPX, so that the peaks may be detected optimally via peak-detecting means QPD, without introducing any phase shift.

By virtue of the means QPD for detecting peaks in the multiplexed radio signal MPX, means D+ and D− for detecting and counting positive peaks and negative peaks, respectively, allow the number of positive and negative noise peaks N+ and N−, respectively, in the multiplexed radio signal MPX in a preset time window to be determined, these positive and negative noise peaks also being referred to as "click noise".

In the system for detecting co-channel interference furthermore comprises deciding means CCL able to determine a score characteristic of the probability that co-channel interference exists in the multiplex radio signal MPX, depending on the number of positive and negative noise peaks N+, N− detected in the preset time window. As seen above, the probability of co-channel interference is high if the number of detected positive noise peaks N+ and the number of detected negative noise peaks N− are similar.

The system for detecting the presence of co-channel interference shown, the deciding means CCL, in order to determine whether co-channel interference is present, also take into account the value of the signal-to-noise ratio C/N. Furthermore, the deciding means CCL, in order to determine whether co-channel interference is present, check whether the multiplexed radio signal MPX has a symmetric passband BW. In the contrary case, the deciding means consider that they are not able to determine whether co-channel interference is present or not.

Such a system for detecting the presence of co-channel interference in a multiplexed FM radio MPX signal thus consists of a computer comprising computing means and an integrated memory, and of means for detecting positive and negative noise peaks, allowing the method for detecting co-channel interference described above to be implemented, so as to form a sensor of co-channel interference.

By virtue of such a system for detecting the presence of co-channel interference, it is possible to identify a situation in which intermodulation products generate such co-channel interference, while the automatic gain control is active.

Figure 3:
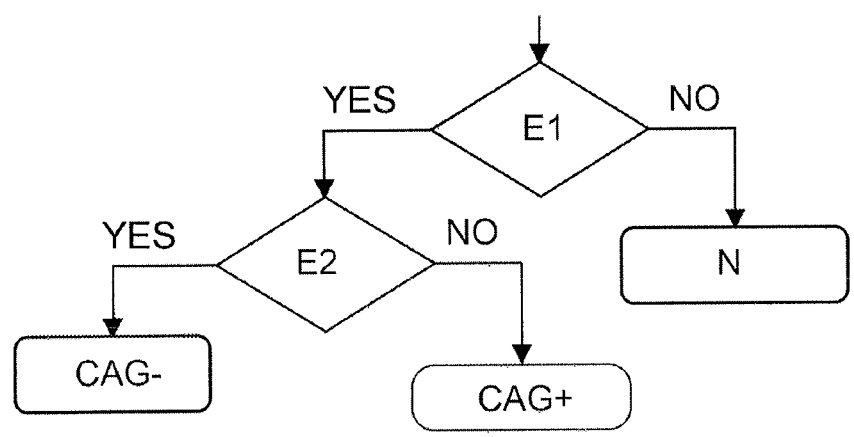

Thus, FIG. 3 shows a flowchart representative of operation of the method according to an aspect of the invention, aiming to optimize the attenuation of interference generated by intermodulation products.

In step E1, it is continually sought to determine whether co-channel interference is present.

If, in step E1, no co-channel interference is detected, then the method according to an aspect of the invention does not continue. This is represented in FIG. 3 by a negative outcome to the method, which outcome is referenced N in FIG. 3.

If, in step E1, co-channel interference is detected to be affecting the desired frequency, then it is checked, in step E2, whether the automatic gain control is active or not.

If, in step E2, the automatic gain control is observed not to be active, then, in step CAG+, the method comprises setting the gain setpoint of the automatic gain control CAG to a first gain setpoint having a high value. For example, the first gain set point may be equal to 88 dB.

If in contrast, in step E2, the automatic gain control is observed to be active, and in step E1 co-channel interference was detected to be affecting the desired frequency, then the method comprises a step CAG− of setting the gain setpoint of the automatic gain control CAG to a second gain setpoint having a value lower than the first gain setpoint. For example, the second gain set point may be equal to 82 dB.

To summarize, an aspect of the invention proposes to modify in real-time the configurable gain setpoint of an automatic gain control, in an FM radio receiver, said gain setpoint being modified depending on whether or not the presence of co-channel interference caused by intermodulation products is detected.

By virtue of an aspect of the invention, the gain setpoint of said automatic gain control may be very high in the absence of such co-channel interference caused by intermodulation products, and low when the presence of such co-channel interference is detected.

It will furthermore be noted that aspects of the present invention are not limited to the embodiment described above, and variants thereof will appear obvious to those skilled in the art.

The invention claimed is:

1. A method for attenuating interference generated by intermodulation products with respect to a multiplexed radio signal comprising a desired frequency, corresponding to the frequency of a frequency-modulated radio signal that a user desires to receive by way of a radio receiver able to receive frequency-modulated radio signals, said method comprising:
    implementing an automatic gain control having a gain setpoint configurable between a first setpoint and a second setpoint, said second setpoint being lower than said first setpoint, said automatic gain control being activated to decrease the gain of the received multiplexed radio signals when the gain of a received multiplex radio signal is higher than said gain setpoint, such that, after application of said automatic gain control, the highest gain of said received multiplexed radio signals is lower than or equal to said gain setpoint;
    configuring the automatic gain control so that the gain setpoint is equal to the first setpoint;
    implementing a detection of the presence of co-channel interference at the desired frequency; and
    if the co-channel interference is detected at the desired frequency, then, if the automatic gain control is active, configuring the automatic gain control so that the gain setpoint is equal to the second setpoint and, if the automatic gain control is not active, configuring the automatic gain control so that the gain setpoint is equal to the first setpoint.

2. The method as claimed in claim 1, wherein the second setpoint is lower than the first setpoint by 3 dB to 12 dB.

3. The method as claimed in claim 2, wherein the first setpoint is equal to 88 dB.

4. The method as claimed in claim 1, wherein the first setpoint is equal to 88 dB.

5. The method as claimed in claim 1, wherein the detection of the presence of co-channel interference comprising:
    checking that said multiplexed radio signal has a symmetric passband;
    detecting and counting a plurality of positive noise peaks and a plurality of negative noise peaks in said multiplexed radio signal during a preset measurement duration;
    calculating a rate of positive or negative noise peaks among said plurality of peaks; and
    determining a score characteristic of a probability that co-channel interference exists in said multiplexed radio signal depending on said rate of positive or negative noise peaks.

6. The method as claimed in claim 5, wherein the detection of the presence of co-channel interference comprises a prior step of comparing the signal-to-noise ratio of the multiplexed radio signal to a preset threshold, a positive or negative noise peak being taken into account only if said signal-to-noise ratio in said multiplexed radio signal is higher than said preset threshold, said preset threshold being equal to 20 dB.

7. The method as claimed in claim 6, wherein said preset measurement time is equal to 128 ms, plus or minus 10 ms.

8. The method as claimed in claim 5, wherein said preset measurement time is equal to 128 ms, plus or minus 10 ms.

9. The method as claimed in claim 5, wherein said score is defined as being equal to:

$$1 - K \times \frac{\text{abs}(N_{mean}^+ - N_{mean}^-)}{N_{mean}^v}$$

where $N_{mean}^+$ is the rate of positive noise peaks averaged over the preset measurement duration, $N_{mean}^-$ is the rate of negative noise peaks averaged over the preset measurement duration, $N_{mean}^v$ is the total number of noise peaks taken into account, and K is a scale factor to be determined.

10. A radio receiver comprising a microcontroller configured to implement the method as claimed in claim 1.

11. A motor vehicle comprising a radio receiver as claimed in claim 10.

12. The method as claimed in claim 1, wherein the second setpoint is lower than the first setpoint by about 6 dB.

* * * * *